April 17, 1928.
A. E. PEW, JR., ET AL
1,666,300
PROCESS AND APPARATUS FOR SEPARATING GASOLINE FROM CRUDE OIL
Filed Feb. 23, 1924
2 Sheets-Sheet 2
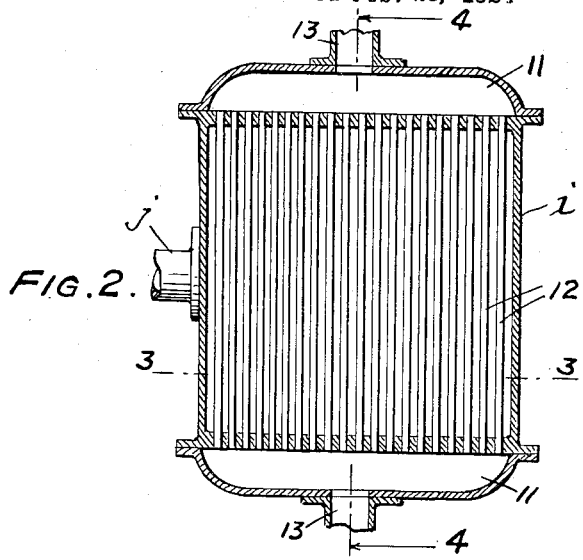
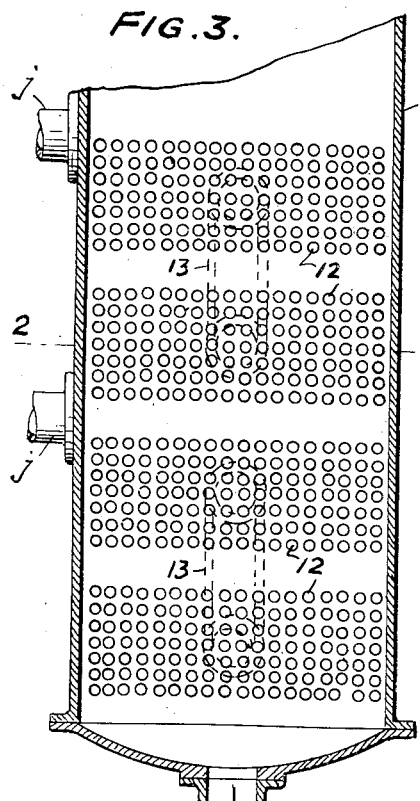
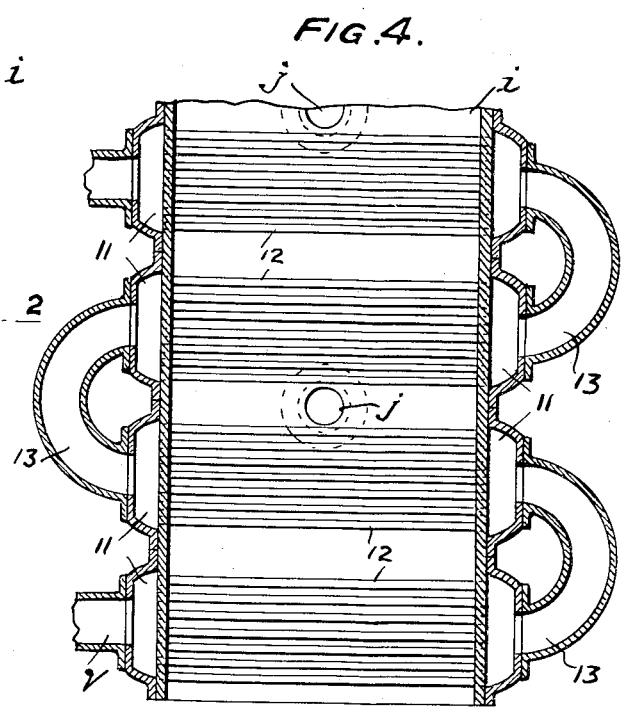
INVENTORS
Arthur E. Pew, Jr. and
Henry Thomas
BY
Busser and Harding
ATTORNEYS.
WITNESS:
Rob't R. Kitchel.

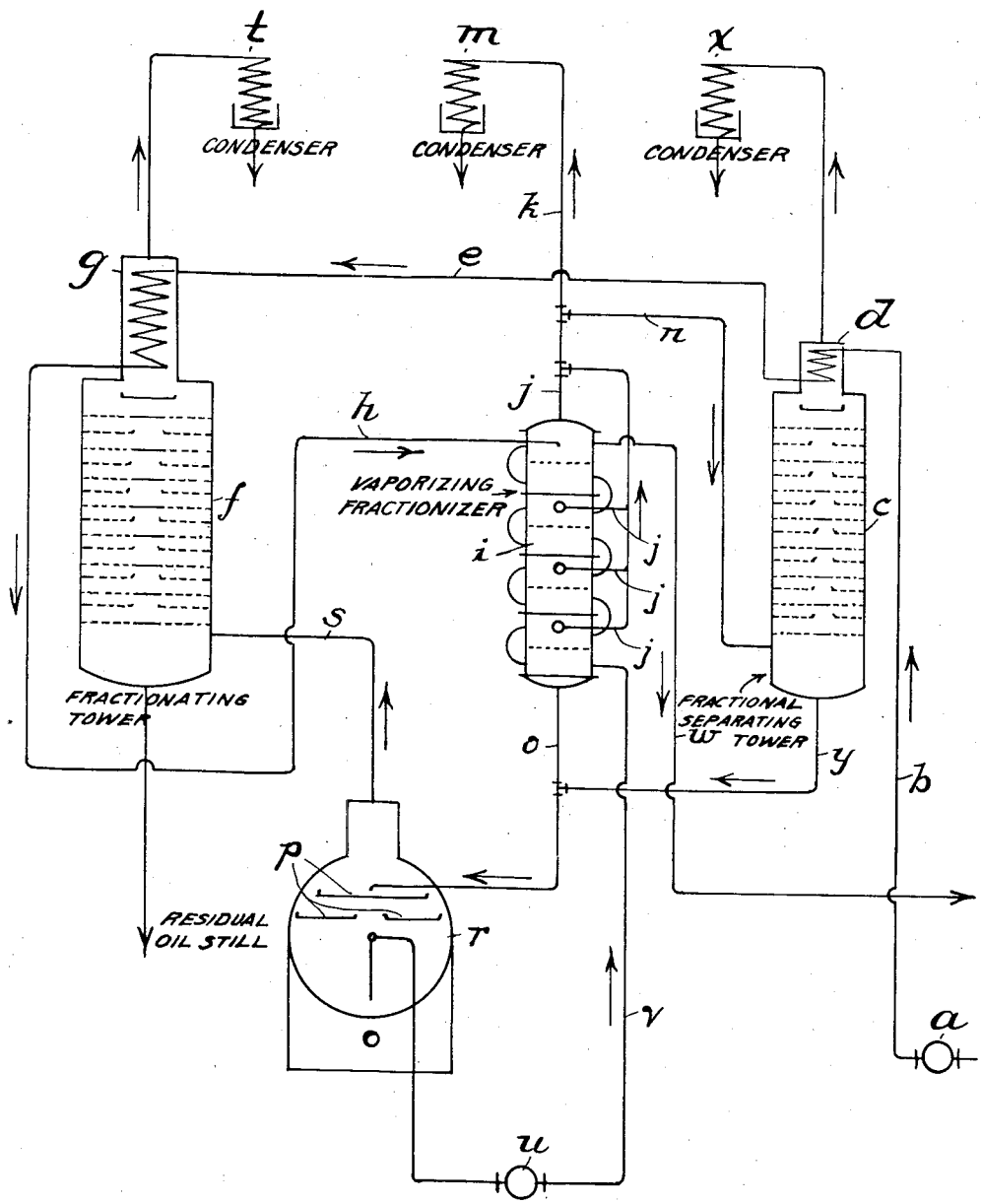

Patented Apr. 17, 1928.

1,666,300

UNITED STATES PATENT OFFICE.

ARTHUR E. PEW, JR., OF BRYN MAWR, AND HENRY THOMAS, OF RIDLEY PARK, PENNSYLVANIA, ASSIGNORS TO SUN OIL COMPANY, OF PHILADELPHIA, PENNSYLVANIA, A CORPORATION OF NEW JERSEY.

PROCESS AND APPARATUS FOR SEPARATING GASOLINE FROM CRUDE OIL.

Application filed February 23, 1924. Serial No. 694,471.

The object of the invention is to effect a practically quantitative separation of gasoline from crude oil.

The invention comprises a process adapted to effect such result and also an apparatus adapted to execute the process with a high degree of efficiency and economy.

In the drawings:

Fig. 1 is a diagram of the entire apparatus.

Figs. 2, 3 and 4 are detail views of a vaporizing fractional distilling unit of the plant; Fig. 2 being a horizontal section through the unit on line 2—2 Fig. 3; and Figs. 3 and 4 vertical sections taken at right angles to each other, on the lines 3—3 and 4—4 respectively of Fig. 2.

Preparatory to a detailed description of the entire apparatus, the operation will be described in a very general way, reference being had to Fig. 1.

Crude oil is pumped through pump $a$ and line $b$, thence through reflux condenser $d$ of fractional separating tower $c$, thence through line $e$ and reflux condenser $g$ of fractional separating tower $f$, and thence through line $h$ to the vaporizing fractional distilling unit $i$. The light distillate fractions herein evaporated are taken off at $j$, $j$, etc. and pass, wholly or partly, through line $k$ to a condenser $m$, or wholly or partly through line $n$ to tower $c$. The residual oil from this distillation in $i$ flows through pipe $o$ into the still $r$, first spreading over the pans $p$, on which occurs vaporization of the remaining and heavier gasoline fractions. Distillate from the still $r$ passes by line $s$ to the tower $f$, wherein the heavier gasoline fractions are vaporized and pass to the condenser $t$, the residual liquid (gas oil) going to storage. The residual oil from the still $r$ is pumped, by pump $u$ through line $v$, to the unit $i$, where its heat is utilized to effect distillation of the lighter gasoline. Deprived largely of its heat, it then flows through line $w$ to storage, where it is utilized as fuel oil, or subjected to further distillation. The light distillate entering tower $c$ from line $n$ is therein fractionated, the vapors passing to a condenser $x$ and the condensate flowing through line $y$ to the still (as shown, through line $o$).

The towers $c$ and $f$ may represent any suitable fractional separator. We prefer to construct them in accordance with Figs. 2, 3, 4, 5 and 6 of an application filed of even date herewith, Serial Number 694,470. As the specific construction of these towers forms no part of the present invention, they need not be herein described.

The pans $p$ in still $r$ are particularly illustrated and described in our said application filed of even date herewith, Serial No. 694,475, and they need not be further described herein.

The preferred specific construction of the vaporizing fractional distilling apparatus $i$ is shown in Figs. 2, 3 and 4.

At opposite sides of the casing of this apparatus $i$ are tiers of headers 11. Connecting opposite headers 11 are tubes 12, which extend through the open interior of the apparatus. Fuel oil from the still $r$ and pipe $v$ enters the lowest header 11 at one side and thence flows through the lower set of tubes 12 to the lowest header 11 on the opposite side. By means of a curved tube 13, the oil flows into a header 11 of the second tier and takes the same course through the second tier of tubes that it took through the first, only in the opposite direction. The oil thus flows successively through all the tiers of headers and tubes, finally discharging into the pipe $w$.

The crude oil entering the top of this apparatus has been raised in temperature, by passage through the reflux condensers $d$ and $g$ of towers $c$ and $f$, and may have any desired temperature, say 190° F. This oil drops on the horizontal tubes 12 and forms a film thereon and drips therefrom onto tubes below. As the oil drips down it contacts with pipes of progressively increasing temperature. The oil pumped from the still toward the lower tier of tubes may have a temperature of (say) 520° F. and the down-dripping oil will finally contact with tubes raised to a temperature approximating the still temperature. There is, therefore, an exchange of heat between the fuel oil flowing through the tubes and the down-dripping crude oil, so that the fuel oil leaving at the top through line $w$ will have a temperature not much above that of the entering crude oil.

In this apparatus, there is a distillation of progressively heavier fractions of gasoline. The vapors may be taken off at as many different levels as desired and may be separately condensed; but this is ordinarily undesirable, and we have, therefore, shown leads $j$ to a common pipe $k$ leading to a condenser $m$. Alternatively, the vapors may be led through pipe $n$ to tower $c$, which is heated only by the heat of the incoming vapors and in which there is some fractionation, the vapors passing to condenser $x$ and the condensate flowing, together with the unvaporized oil dripping off the lowest tubes 12, into the still.

It will be understood that, preferably, the separation of only the lighter gasoline is contemplated in the multiple-tube distiller $i$ and the tower $c$, the oil flowing through pipe $o$ containing heavier gasoline fractions. These fractions will all evaporate on the pans $p$ and will not enter the body of oil in the still at all if the still is maintained at a proper temperature, say 520° F. The distillate from the still enters tower $f$ and is there fractionated, the vapors comprising all the heavier fractions of gasoline, passing to the condenser $t$.

While we have described the apparatus and process as adapted to the separation of gasoline from crude oil, it will be understood that they are also applicable, under different conditions of heat, to the separation of light cuts from any petroleum distillate. Where, therefore, in the claims, reference is made to the separation of gasoline from crude oil, it is intended to include, as an equivalent, the separation of any lighter fraction or fractions of mineral oil from a heavier fraction or fractions thereof, such as a petroleum distillate.

No special means need be adapted to regulate the pressure throughout the system, but if desired any predetermined absolute pressure may be obtained, by known means, from superatmospheric pressure to a high degree of vacuum. The system is especially adapted to vacuum distillation, and it is preferable to use a high degree of vacuum, varying from an absolute pressure not exceeding twenty-five millimeters mercury down to as near zero pressure as is practicable.

Having now fully described our invention, what we claim and desire to protect by Letters Patent is:

1. The process of vaporizing mineral oil which comprises heating mineral oil to a distilling temperature and flowing a stream of said hot oil within a still at successively higher elevations and dividing the hot oil flowing at each elevation into confined, multiple, spaced apart streams, flowing mineral oil to be vaporized into the upper part of the still and so disseminating it that it passes into heat exchange relation, but out of contact, with said first mentioned hot oil streams and distributes itself in thin films in heat exchange relation with successively lower oil streams and with progressively hotter multiple oil streams at successively lower elevations so as to produce an intensive heating action and progressive fractional vaporization as well as the substantially complete vaporization of fractions having boiling points below the progressively rising temperatures to which the downflowing distributed and disseminated oil is subjected.

2. A fractional distilling apparatus of the character described comprising a casing, a multiplicity of tubes extending laterally through the casing, a residual oil still separate from said casing and in which relatively high boiling point fractions of the oil are adapted to be vaporized, said still having a vapor outlet, a fractionating tower communicating with the vapor outlet from said still and having a vapor outlet, means adapted to convey a stream of residual oil from said still and distribute the oil to said tubes, means adapted to convey a stream of oil to the upper part of said casing, said last named oil-conveying means being in heat exchange relation with said vapor outlet of the fractionating tower, and means adapted to convey residual oil from the casing to the still.

3. A fractional distilling apparatus of the character described comprising a casing, a multiplicity of tubes extending laterally through the casing, a residual oil still in which relatively high boiling point fractions of the oil are adapted to be vaporized, means adapted to convey residual oil from said still and distribute the oil to said tubes, said casing having a vapor outlet, a fractional separating tower having a vapor outlet, means adapted to convey vapor from the vapor outlet from the casing to the fractional separating tower, means adapted to convey a stream of oil to the upper part of said casing, said last named oil conveying means being in heat exchange relation with the vapor outlet from said fractional separating tower, and means to convey residual oil from the casing and from the fractional separating tower to the still.

4. A fractional distilling apparatus of the character described comprising a casing, a multiplicity of tubes extending laterally through the casing, a residual oil still in which relatively high boiling point fractions of the oil are adapted to be vaporized, said still having a vapor outlet, a fractionating tower communicating with the vapor outlet from said still and having a vapor outlet, means adapted to convey a stream of residual oil from said still and distribute the oil to said tubes, a vapor outlet from the casing, a fractional separating tower having a vapor outlet and connected with the vapor outlet from the casing, means to convey a stream of oil to the upper part of said casing, said last named oil-conveying means being in heat-exchange relation with the vapor outlet from said fractionating tower and said vapor outlet from said fractional separating tower, and means to convey residual oil from the casing to the still.

5. The process of vaporizing mineral oil which comprises heating mineral oil to a distilling temperature and flowing a stream of said hot oil within a still at successively higher elevations and dividing the hot oil flowing at such elevation into confined, multiple, spaced apart streams, flowing mineral oil to be vaporized into the upper part of the still and so disseminating it that it passes into heat exchange relation, but out of contact, with said first mentioned hot oil streams and distributes itself in thin films in heat exchange relation with successively lower oil streams and with progressively hotter multiple oil streams at successively lower elevations so as to produce an intensive heating action and progressive fractional vaporization as well as the substantially complete vaporization of fractions having boiling points below the progressively rising temperatures to which the downflowing distributed and disseminated oil is subjected, removing the vapors, effecting vaporization in another still of still higher boiling fractions, and utilizing the residue of the last vaporization to afford a continuous supply of oil for circulation through the first still at the specified successively higher elevations.

6. The process as set forth in claim 1 wherein the vaporizing space within the still is maintained under a vacuum.

7. The process of separating gasoline from crude mineral oil which comprises circulating highly heated mineral oil in circuitous and confined paths back and forth at progressively higher levels within a confined space, flowing another stream of mineral oil to be vaporized at a substantially lower temperature toward and into said confined space and allowing it to descend by gravity within said space and spread out over said confined paths and thereby absorb heat from the first mentioned hotter oil without direct contact therewith and be thereby partly vaporized, then heating the residue to a higher temperature to effect vaporization of higher boiling fractions, utilizing the residue of the last vaporization to afford a continued supply of oil for circulation back and forth as specified, fractionating the vapors of the last vaporization, and utilizing the vapors from the last fractionation to preheat the second named stream of mineral oil in its flow toward said confined space.

8. The process of separating gasoline from crude mineral oil which comprises circulating highly heated mineral oil in circuitous and confined paths back and forth at progressively higher levels within a confined space, flowing another stream of mineral oil to be vaporized at a substantially lower temperature toward and into said confined space and allowing it to descend by gravity within said space and spread out over said confined paths and thereby absorb heat from the first mentioned hotter oil without direct contact therewith and be thereby partly vaporized, then heating the residue to a higher temperature to effect further partial vaporization, utilizing the residue of the last vaporization to afford a continued supply of oil for circulation back and forth as specified, fractionating vapors of the first vaporization specified, and utilizing the vapors from such fractionation to preheat the oil in the second named stream of mineral oil as it flows toward said confined space.

9. The process of separating gasoline from crude mineral oil which comprises circulating highly heated mineral oil in circuitous and confined paths back and forth at progressively higher levels within a confined space, flowing another stream of mineral oil to be vaporized at a substantially lower temperature toward and into said confined space and allowing it to descend by gravity within said space and spread out over said confined paths and thereby absorb heat from the first mentioned hotter oil without direct contact therewith and be thereby partly vaporized, then heating the residue to a higher temperature to effect further partial vaporization, utilizing the residue of the last vaporization to afford a continued supply of oil for circulation back and forth as specified, fractionating the vapors of the first vaporization, and returning the residual oil from such fractionation to the residue above specified that is being subjected to further partial vaporization.

In testimony of which invention, we have hereunto set our hands, at Philadelphia, Pa., on this 14th day of February, 1924.

ARTHUR E. PEW, JR.
HENRY THOMAS.